3,332,121
FISH STRINGER
Gerald J. Curtis, 8806 Glen Loch, Houston, Tex. 77008
Filed Feb. 18, 1966, Ser. No. 528,629
2 Claims. (Cl. 24—257)

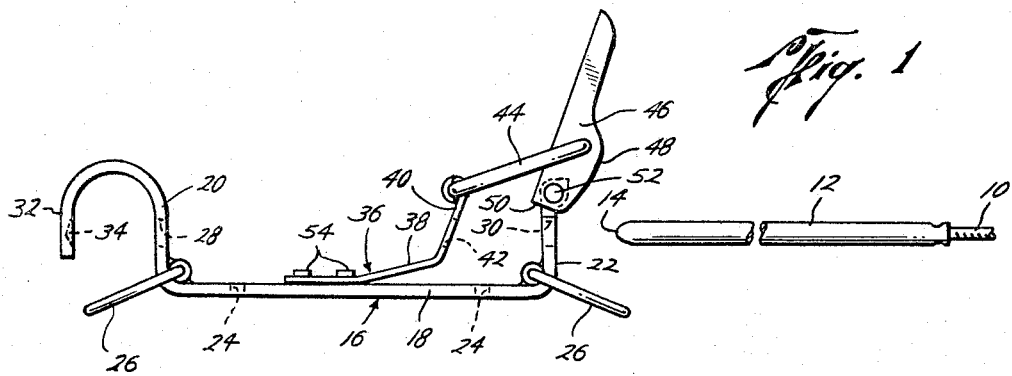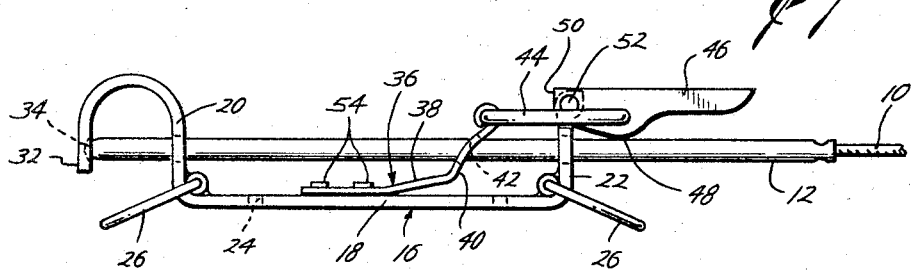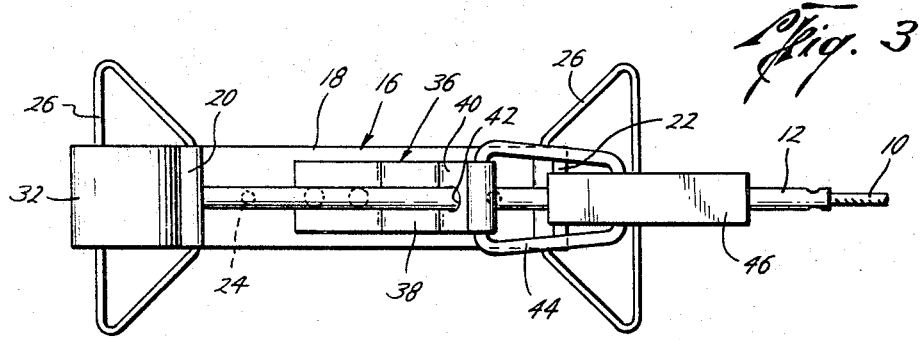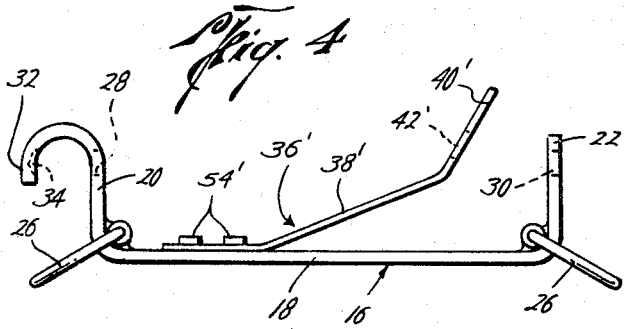
Gerald J. Curtis
INVENTOR.
BY Charles E. Lightfoot
ATTORNEY

This invention relates to a fish stringer, and more particularly to a stringer of the type having a cord or the like provided with a needle or spike for use in stringing the fish and which is also provided with means for releasably gripping the needle or spike whereby the string of fish may be tethered to a support.

The invention has for a chief object the provision of a securing device for a fish stringer which may be worn by the user while wade-fishing and which may also be attached to a support such as a boat, and which is designed to releasably grip the needle or spike of a stringer to securely hold the same.

Another object of the invention is to provide a securing device into which the needle or spike of a fish stringer may be inserted to releasably grip the same, but which is constructed to permit the ready release and withdrawal of the needle or spike by the use of only one hand.

A further object of the invention is the provision of a fish stringer device which is of simple design and rugged construction and which is safe in use.

The above objects and other obvious advantages of the invention will be apparent from the following detailed description when considered with the annexed drawings, wherein—

FIGURE 1 is a side elevational view of a preferred embodiment of the invention showing the needle gripping device thereof in its releasing position with the needle removed therefrom;

FIGURE 2 is a view similar to that of FIGURE 1 showing the needle gripping device in its gripping position with the needle inserted therein;

FIGURE 3 is a top plan view of the invention as illustrated in FIGURE 2; and

FIGURE 4 is a side elevational view of a somewhat modified form of the invention.

Referring now to the drawings in greater detail the invention is illustrated herein in connection with a fishing stringer of the type having a cord or other suitable strand element 10, of the usual kind, which carries at one end a needle or spike 12, whose free end is more or less pointed, as seen at 14, to allow the needle to be inserted through the gills and mouth of a fish whereby the fish may be strung on the cord in the usual manner. The cord 10 may be attached at its other end to a ring or other suitable means not shown by which the fish are prevented from coming off of the string.

The releasable needle gripping or holding device of the invention comprises a main body or frame 16, which is of generally U-shape, formed of flat, strip-like material, having an elongated bottom portion 18 provided with arms 20 and 22 at its opposite ends extending substantially at right angles to said bottom.

The bottom 18 of the frame is provided with spaced apart perforations 24 by which the frame may be secured to a suitable support, such as a boat, as by means of screws.

Suitable means, such as the belt loops 26 may also be pivotally secured to the frame at longitudinally spaced locations thereon, through which a belt may be passed, to permit the device to be worn by a user when wade fishing.

The arms 20 and 22 of the frame are provided with openings 28 and 30, respectively, through which the needle 12 may be inserted longitudinally of the frame and the arm 20 is formed with a rebent portion 32, whose free end portion is positioned to be engaged by the point 14 of the needle to serve as an end stop therefor and to cover the point when the needle is inserted to prevent injury to the user by contact therewith. The rebent portion 32 may be formed with an indentation 34 to receive the point of the needle.

A resilient needle gripping element or member 36, which may conveniently be formed of flat, spring-like, sheet material, is attached at one end to the bottom 18 of the frame, between the arms 20 and 22, and extends upwardly angularly therefrom, which element has an upwardly bent intermediate portion 38 and a further upwardly bent portion 40, which has a perforation 42 therethrough through which the needle 12 may be extended.

At its free outer end the element 36 carries a loop or link 44, pivotally connected thereto, which is also pivotally connected to a latching member or lever 46 mediate the ends thereof, which latching member is pivotally connected at its lower end to the upper end of the arm 22.

The member 46 is shaped for engagement with the needle 12 to limit latching movement of the member when the needle is inserted in the frame, as seen at 48 in FIGURE 2, and has a flattened end face 50 at its lower end which is positioned for engagement with an adjacent abuttment face of the arm 22 to limit unlatching movement of the member when the member is moved toward unlatching position, as shown in FIGURE 1.

In making use of the device, constructed as described above, the frame 16 will be mounted on a belt by means of the loops 26 or will be suitably attached to a support structure, such as a boat, as by means of screws extending through the perforations 24. With the latching member 46 in the unlatching position the perforation 42 of the gripping element 36 will be in alignment with the openings 28 and 30 of arms 20 and 22, and the needle 12 may then be inserted through the openings and perforation to engage the point 14 of the needle in the indentation 34. With the needle thus inserted the latching member 46 is then moved to the latching position of FIGURE 2, whereupon the gripping element will be grippingly engaged with the needle in the perforation 42, the portion 40 of the gripping element being somewhat bowed to cause the element to tightly grip the needle as seen in FIGURE 2. Edge portions of the gripping member 36 in the perforation 40 will be in tight gripping engagement with the needle when the device is thus latched. In the latched position of the device it will be seen that the link or loop 44 is positioned slightly below the pivot point 52 of the latching lever 46 on the arm 22, so that the gripping element 36 is tightly held in gripping engagement with the needle until the latching lever is moved toward its releasing position, whereby the device is prevented from accidental releasing.

When it is desired to release the needle, the needle may be grasped by the user and the lever 46 moved to unlatching position with the thumb by the use of one hand, thus leaving the user with his other hand free to handle the fish.

It will also be apparent that the point of the needle is enclosed when the needle is in its inserted position in the frame so that the point cannot come in contact with the user's body.

A somewhat modified form of the invention is illustrated in FIGURE 4 wherein the needle gripping element 36' is similar to the element 36 previously described, but does not have the latching mechanism associated therewith. In this form of the invention the element 36' is attached to the bottom portion 18 of the frame 16, as by means of rivets 54' as in the form illustrated in FIGURES 1 to 3, the element also having the upwardly bent portions 28' and 40' with the perforation 42'. The upper end of the element 36' is free and is positioned to be depressed by the user to release the needle, the element being formed of spring-like material whereby the element will be yieldingly held in gripping engagement with the needle by the resiliency of the material when the needle is inserted through openings 28 and 30 and perforation 42'. In other respects the form of the invention shown in FIGURE 4 is similar to and operates in the same way as the form illustrated in FIGURES 1 to 3.

It will thus be seen that the invention provides a fish stringer device which is of simple design and economical manufacture, which may be conveniently carried by the user or permanently mounted on a support, which is safe in use and which is easily operated by one hand.

The invention is disclosed herein in connection with certain specific embodiments of the same, which it will be understood are capable of modification within the scope of the appended claims.

Having thus clearly shown and described the invention, what is claimed as new and desired to secure by Letters Patent is:

1. In a fish stringer of the type having a needle, a device for releasably holding the needle comprising a generally U-shaped frame formed of rigid material having axially aligned openings in its arms through which the needle may be extended, a resilient gripping element on the frame between the arms having a perforation through which the needle may be extended through said openings and positioned for yielding engagement with the needle to grip the needle between the frame and element in the openings and perforation when the needle is inserted therethrough, latching means movably mounted on the frame and means forming a connection between said latching means and said element to hold the element in gripping engagement with the needle upon movement of the latching means in one direction and to move the element out of such engagement upon movement of the latching means in the other direction.

2. The invention as defined in claim 1 including means releasably holding said latching means against movement in a direction to release said needle.

References Cited
UNITED STATES PATENTS

| | | | |
|---|---|---|---|
| 1,005,283 | 10/1911 | Neher. | |
| 2,800,263 | 7/1957 | Hunt | 224—7 |
| 3,052,002 | 9/1962 | Lesher | 24—134 X |
| 3,172,583 | 3/1965 | Smith | 224—5 |

GERALD M. FORLENZA, *Primary Examiner.*

F. E. WERNER, *Assistant Examiner.*